US008392432B2

(12) United States Patent
Wu et al.

(10) Patent No.: US 8,392,432 B2
(45) Date of Patent: Mar. 5, 2013

(54) MAKE AND MODEL CLASSIFIER

(75) Inventors: Lingfeng Wu, Beijing (CN); Wenjun Dai, Beijing (CN); Xiao Wu, Beijing (CN); Xiaolei Li, Kirkland, WA (US); Vu Anh Ha, Kirkland, WA (US); Weibin Zhu, Beiging (CN)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 12/758,539

(22) Filed: Apr. 12, 2010

(65) Prior Publication Data

US 2011/0252042 A1   Oct. 13, 2011

(51) Int. Cl.
*G06F 17/30* (2006.01)
(52) U.S. Cl. ......... 707/748; 707/771; 707/777; 707/778
(58) Field of Classification Search .................. 707/748, 707/771, 777, 778
See application file for complete search history.

(56) References Cited

U.S. PATENT DOCUMENTS

| | | | | |
|---|---|---|---|---|
| 6,233,575 | B1 * | 5/2001 | Agrawal et al. | 707/999.002 |
| 6,385,619 | B1 * | 5/2002 | Eichstaedt et al. | 707/748 |
| 6,751,600 | B1 * | 6/2004 | Wolin | 707/E17.09 |
| 6,785,683 | B1 * | 8/2004 | Yaeli et al. | 707/999.101 |
| 7,711,747 | B2 * | 5/2010 | Renders et al. | 707/771 |
| 7,725,463 | B2 * | 5/2010 | Hurst-Hiller et al. | 707/748 |
| 7,756,845 | B2 * | 7/2010 | Madani et al. | 707/748 |
| 8,161,028 | B2 * | 4/2012 | Hu et al. | 707/771 |
| 2003/0233350 | A1 * | 12/2003 | Dedhia et al. | 707/3 |
| 2004/0139059 | A1 * | 7/2004 | Conroy et al. | 707/3 |
| 2005/0144114 | A1 * | 6/2005 | Ruggieri et al. | 705/37 |
| 2005/0267657 | A1 | 12/2005 | Devdhar | |
| 2006/0041604 | A1 * | 2/2006 | Peh | 707/205 |
| 2006/0242147 | A1 * | 10/2006 | Gehrking et al. | 707/7 |
| 2007/0043774 | A1 * | 2/2007 | Davis et al. | 707/200 |
| 2008/0189307 | A1 * | 8/2008 | Sankaran et al. | 707/100 |
| 2008/0249764 | A1 | 10/2008 | Huang et al. | |
| 2010/0082628 | A1 * | 4/2010 | Scholz | 707/740 |
| 2011/0047161 | A1 * | 2/2011 | Myaeng et al. | 707/740 |
| 2011/0113047 | A1 * | 5/2011 | Guardalben | 707/754 |

OTHER PUBLICATIONS

Jiuyong Li, et al., "Using Multiple and Negative Target Rules to Make Classifiers More Understandable"; Published Date: pre-print submitted to Elsevier Science Oct. 5, 2006; 15 pages; http://www.cis.unisa.edu.au/~lijy/understanding.pdf.

Frederick Reiss, et al., "An Algebraic Approach to Rule-Based Information Extraction"; IBM Almaden Research Center; San Jose, CA; Published Date: 2008; 10 pages; http://www.almaden.ibm.com/cs/projects/avatar/pubs/icde2008.pdf.

(Continued)

*Primary Examiner* — Rehana Perveen
*Assistant Examiner* — Tiffany Thuy Bui
(74) *Attorney, Agent, or Firm* — Shook, Hardy & Bacon L.L.P.

(57) ABSTRACT

Systems and methods for assigning a product category and/or classification to user data based on a taxonomy of makes and models is provided. User data is received and converted to plain text. A taxonomy is provided, having a plurality of categories corresponding with product descriptions based on product makes and models. Rules are associated with the categories in the taxonomy and used to generate a category score for categories in the taxonomy. The category scores are used to assign at least one category from the taxonomy to the user data. A product class may also be assigned to the user data based on the assigned product category.

17 Claims, 6 Drawing Sheets

OTHER PUBLICATIONS

Hui Han, et al., "Rule-Based Word Clustering for Document Metadata Extraction"; Published Date: Mar. 13-17, 2005; ACM Symposium on Applied Computing; Santa Fe, New Mexico; 5 pages; http://clgiles.ist.psu.edu/papers/SAC-2005-Document-Metadata-Extraction.pdf.

Nipun Bhatia, et al., "Extraction of Structured Information from Online Automobile Advertisements"; Department of Computer Science, Stanford University; Published Date: Jun. 6, 2008; 8 pages; http://nlp.stanford.edu/courses/cs224n/2008/reports/13.pdf.

David W. Embley, "Toward Semantic Understanding—an Approach Based on Information Extraction Ontologies"; Department of Computer Science, Brigham Young University; Provo, UT; Published Date: 2004; 5 pages; http://crpit.com/confpapers/CRPITV27Embley.pdf.

* cited by examiner

MAKE AND MODEL CLASSIFIER

BACKGROUND

Personalized content delivery presents specific items of digital content to specific users. For instance, search results presented in response to a user query on a search results webpage may be personalized to the particular preferences of a user. Similarly, personalized content may be displayed on webpages, delivered as part of advertisements, and the like.

Determining a user's preferences for particular products helps determine which items of digital content are most relevant to a user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to assigning make and model categories and/or classifications to user data. A taxonomy of makes and models is provided, having a plurality of categories corresponding with product descriptions based on product makes and models. User data is received and converted to plain text. Rules are associated with the categories in the taxonomy and used to generate a category score for categories in the taxonomy. The category scores are used to assign at least one category from the taxonomy to the user data. A product class may also be assigned to the user data based on the assigned product category.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to assigning a product category and/or classification to user data based on a taxonomy of makes and models. In this regard, user data includes, for instance, any number of webpages accessed by or search queries entered by a user or group of users. For example, user-submitted search queries provide user data from which a make and model category and/or classification may be assigned. User data may be a single item of user data, or multiple items of user data from a single or multiple users. In accordance with some embodiments, user data is converted into plain text format so that the terms in the user data may be associated with terms in rules, and therefore used to assign a category in a taxonomy to the user data.

Figure 6:
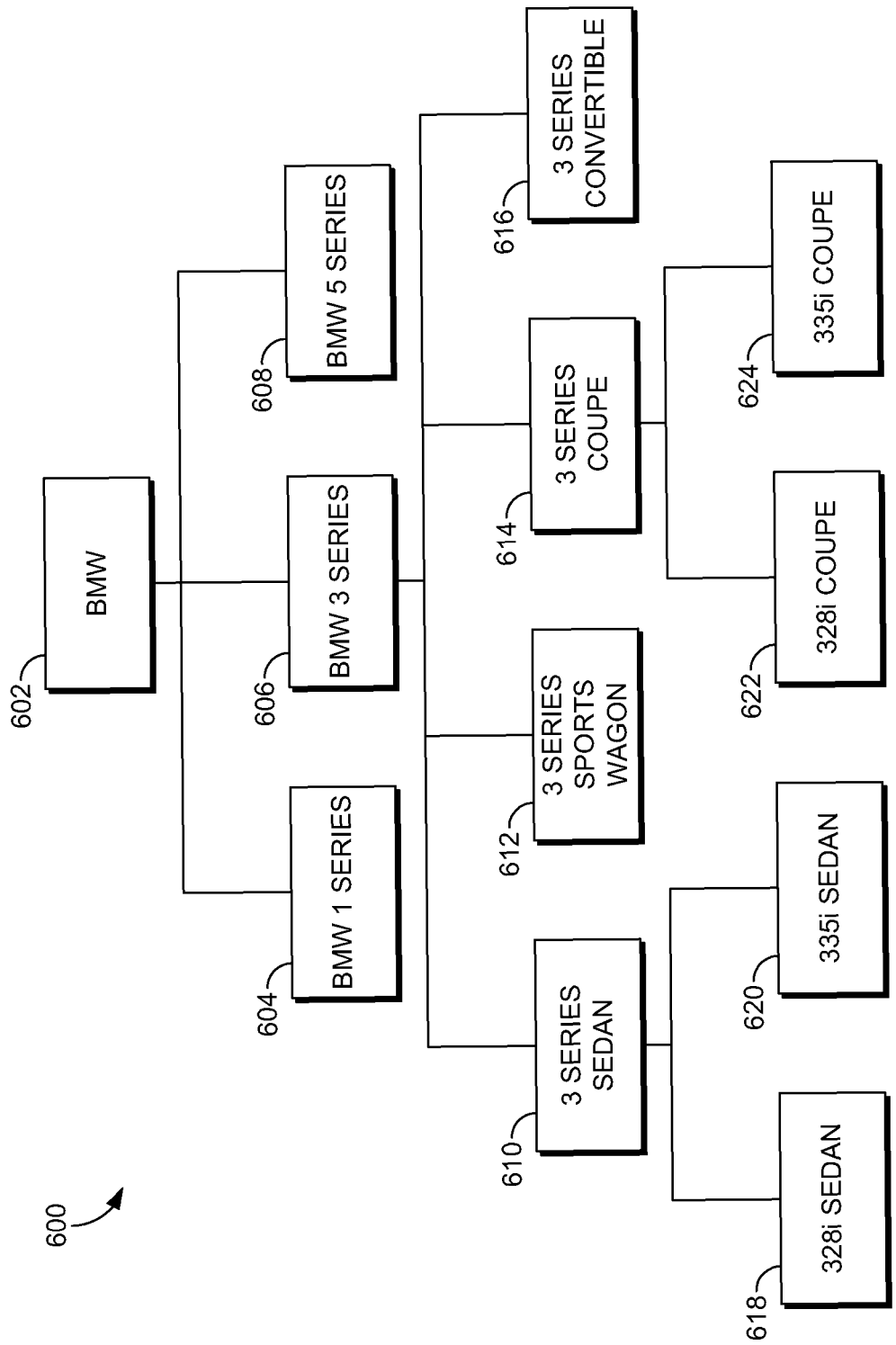
FIG. 6 is a block diagram of an exemplary taxonomy suitable for user in implementing embodiments of the present invention.

A taxonomy is provided for product makes and models. A taxonomy refers to a plurality of hierarchical categories that correspond with product descriptions based on product makes and models. In embodiments, the categories in a taxonomy correspond with product descriptions based on product makes, models, and classes. Categories may be hierarchically arranged in the taxonomy such that each category may be associated with zero or more parent categories, and zero or more child categories (also referred to herein as sub-categories.) In embodiments, each category in a taxonomy is associated with a single parent category, and each category may be associated with zero or more child categories. The taxonomy may include high level categories with a higher level of specificity (less specific), and lower level categories with a lower level of specificity (more specific.) A taxonomy may be created for any number of different products that include different models, such as the different models of a particular camera brand, or the varying models of a particular automobile manufacturer. For example, a taxonomy may be created for a particular automobile make, such as a BMW. With reference to FIG. 6, a simplified taxonomy 600 is presented, for illustrative purposes only. The taxonomy 600 for the BMW 602 includes multiple categories for multiple models, such as for the BMW 1 Series 604, BMW 3 Series 606, and BMW 5 Series 608. The 1 Series, 3 Series and 5 Series categories may also include additional child categories. For instance, the BMW 3 Series 606 category may include additional categories such as the BMW 3-Series Sedan 610, 3 Series Sports Wagon 612, 3 Series Coupe 614, and 3 Series Convertible 616. The taxonomy may include even more additional child categories included within these sub-categories, such as the 328i Sedan 618 and 335i Sedan 620, or the 328i Coupe 622 and 335i Coupe 624.

Rules are created for each category in a taxonomy. In one embodiment, a rule refers to a pair of a term(s) and weight(s) for a particular category that is used to associate user data with one or more categories. Rules for a particular category may be referred to as <term, weight> pairs. A rule may be a single rule or multiple rules for a category in a taxonomy. As such, a single category may be associated with any number of rules for the same product model. A term refers to a single word or multiple words included in a rule. In embodiments, the rules for categories in a taxonomy are sorted by the number of words in the terms. Multiple rules for the same category may be based on spelling, formatting, and other variations of term characteristics. For instance, there may be multiple rules for the BMW 3 Series Sports Wagon category based on minor variations in the terms of the rules, such as "BMW 3 Series Sports Wagon," "BMW 3 Series Sport Wagon," or "BMW 3

Series Wagon." A weight refers to a value associated with the term in a rule. For example, a rule for a BMW 3 Series category may include the term "BMW 3 Series" and a weight of "2," such that the rule includes the pair "<BMW 3 Series, 2>." In one embodiment, the weights for rules are predetermined.

When analyzing user data, a category score is generated for categories in a taxonomy by comparing plain text for the user data to the terms in a rule. In embodiments, plain text may satisfy more than one rule for the same product category or multiple rules in different categories. Based on the weights associated with the satisfied rules, a category score is generated for the categories in a taxonomy. For example, a category score of "2" will be generated based on the weight assigned in the "<BMW 3 Series, 2>" rule. Multiple rules for the same category may generate different category scores based on the weight of the rules. For example, two rules for the BMW 3 Series category may define two different variations of the terms, such that "<BMW 3, 1>" assigns a category score of one, and "<BMW 3 Series, 2>" assigns a category score of two. In embodiments, scores generated by multiple satisfied rules for the same category are aggregated together to generate a combined category score for a single category. As such, a category with multiple satisfied rules may have a higher aggregated category score than a category with only a single satisfied rule.

Product categories are assigned to user data based on category scores. A single or multiple categories in a taxonomy may be assigned to user data. In one embodiment, when category scores are generated for more than one category in a taxonomy, a category may be assigned to user data based on the value of the category scores. As such, a category score of three may outweigh a category score of 1, such that the product category corresponding to the higher category sore is assigned to the user data. In embodiments, a result list of category scores assigned to user data is generated. The result list may be sorted such that assigned product categories with higher category scores are positioned above categories with lower category scores. In one embodiment, categories in a taxonomy are mapped to corresponding classes associated with one or more taxonomies. As such, user data may be assigned to a single or multiple product classes based on assigned product categories. For example, user data assigned to the category "BMW 3 Series" may be further associated with the class "Luxury Car."

As previously discussed, categories in a taxonomy may include child categories, or sub-categories, based on descriptions of product makes and models. These child categories or sub-categories are associated with rules that are used to generate category scores. The child categories, or sub-categories, are assigned to the user data based on category scores. For example, a category score may be generated for the BMW 3 Series category based on a rule with the term "BMW 3 Series," but the plain text of the user data may also include the term "BMW 3 Series Wagon." As such, the rules of the additional category for "BMW 3 Series Sports Wagon" may be applied to the user data in order to generate a category score and assign this additional category to the user data.

In one embodiment, categories in a taxonomy are analyzed starting at a highest level and continuing through lower levels. Categories at a first level are initially analyzed to generate category scores. Top confident categories are determined from that level based on the generated category scores. In one embodiment, top confident categories refer to the categories for which the category score exceeds an established threshold. For example, the top confident category score threshold for the BMW 3 Series category may be a score of at least three. In another embodiment, top confident categories are selected from a top number of assigned categories, for instance, the top three assigned categories. In a further embodiment, top confident categories are determined based on a dynamic threshold, such as selecting the assigned categories with a category score that exceeds the value of other category scores by a specified amount. Having selected top confident categories at a level, it is determined whether any of the top confident categories include any child categories, or sub-categories. Category scores are generated for next-level categories based on rules for these categories and used to assign additional categories to the user data. In embodiments, the additional assigned categories are added to a result list. In one embodiment, categories in a taxonomy are mapped to one or more corresponding product classes. As such, an assigned category may be associated with a pre-determined class. Alternatively, corresponding product classes may be associated with rules for determining if the user data matches the product class. For example, a category may be assigned to user data based on rules, and a product class may be assigned to user data based on rules.

Based on any additional assigned categories assigned to user data, a class may be assigned to the user data. For example, plain text containing the terms "BMW 3 Series Wagon" is first assigned to the "BMW 3 Series" category and the "Luxury Car" class, and upon classification as a "BMW 3 Series Sports Wagon," may also be assigned to the "Family Car" class. In embodiments, user data may be associated with product makes, models, and classes that are all part of a single or multiple taxonomies. For instance, categories of makes and models, and classes, may be mapped to any number of other categories and classes, as long as the rules for the categories and classes to not conflict.

In one embodiment, assigning categories in a taxonomy to user data is done by evaluating all categories in a taxonomy at the same time. Alternatively, different levels of a taxonomy may be evaluated in different steps. For example, the rules for a first level of categories in a taxonomy may be evaluated to assign first-level categories to the user data. Next, it is determined whether any of the assigned categories of the first level include any child categories in a second level. After assigning categories from the second level, the process of assigning additional categories may be continued until it is determined that no assigned categories include additional categories.

Accordingly, in one aspect, an embodiment of the present invention is directed to one or more computer-readable media storing computer-useable instructions that, when used by one or more computing devices, causes the one or more computing devices to perform a method. The method includes providing a taxonomy having a plurality of categories, each category corresponding with a product description based on product makes and models. The method also includes associating one or more rules with each category in the taxonomy. The method further includes receiving user data and converting the user data into plain text. The method still further includes generating a category score for each of one or more categories in the taxonomy by comparing the plain text to one or more rules of the one or more categories. The method also includes assigning at least one category from the one or more categories to the user data based on the category score for each of the one or more categories.

In another embodiment, an aspect of the invention is directed to a computer system executed by one or more computer processors. The system includes a user data component for receiving user data and converting the user data into plain text. The system also includes an assigning component for assigning at least one category from a plurality of categories in a taxonomy to the plain text, each category corresponding with a product description based on product makes and models. The system further includes a reporting component for reporting the assigned at least one category.

A further embodiment of the present invention is directed to one or more computer-readable media storing computer-useable instructions that, when used by one or more computing devices, causes the one or more computing devices to perform a method. The method includes providing a taxonomy having a plurality of categories, each category corresponding with a product description based on product makes and models. The method also includes associating one or more rules with each category in the taxonomy, each rule comprising one or more pairs of terms associated with weights. The method further includes receiving user data, wherein the user data is received from one or more of a plurality of page views and a plurality of search queries. The method still further includes converting the user data to plain text. The method also includes sorting the one or more rules for each category in the taxonomy by a number of words in one or more terms. The method further includes generating a category score for each of one or more categories in the taxonomy by comparing the plain text to one or more rules of the one or more categories. The method still further includes assigning at least one category from the one or more categories to the user data based on the category score for each of the one or more categories. The method also includes selecting one or more top confident categories by comparing the category scores for each of the at least one assigned categories with one or more thresholds. The method further includes determining that the one or more top confident categories include at least one additional category. The method still further includes assigning at least one additional category from the one or more top confident categories based on comparing the plain text to one or more rules of the at least one additional categories and generating a category score for each of the at least one additional categories. The method also includes assigning at least one class to the user data based on the at least one assigned category and the at least one assigned additional category.

Figure 1:
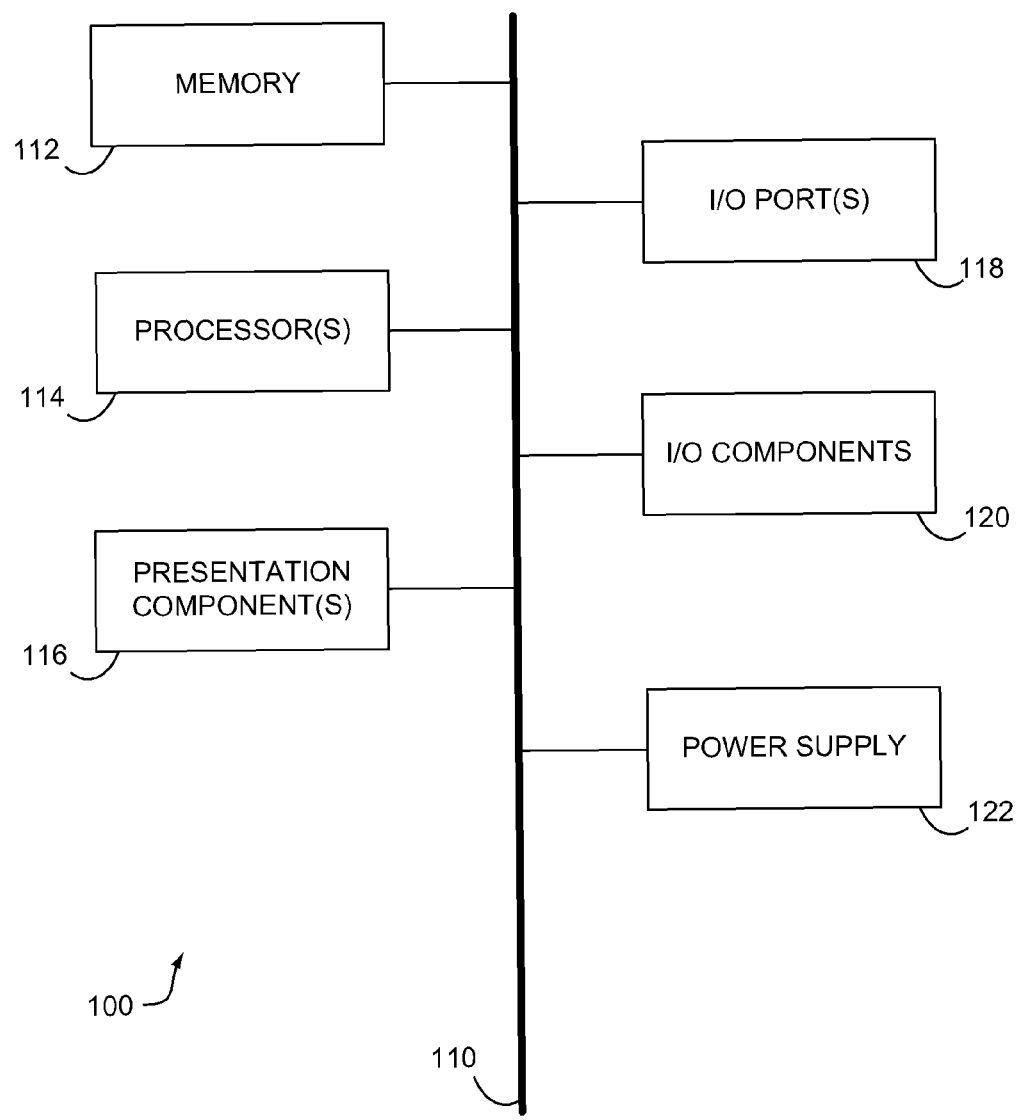
FIG. 1 is an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
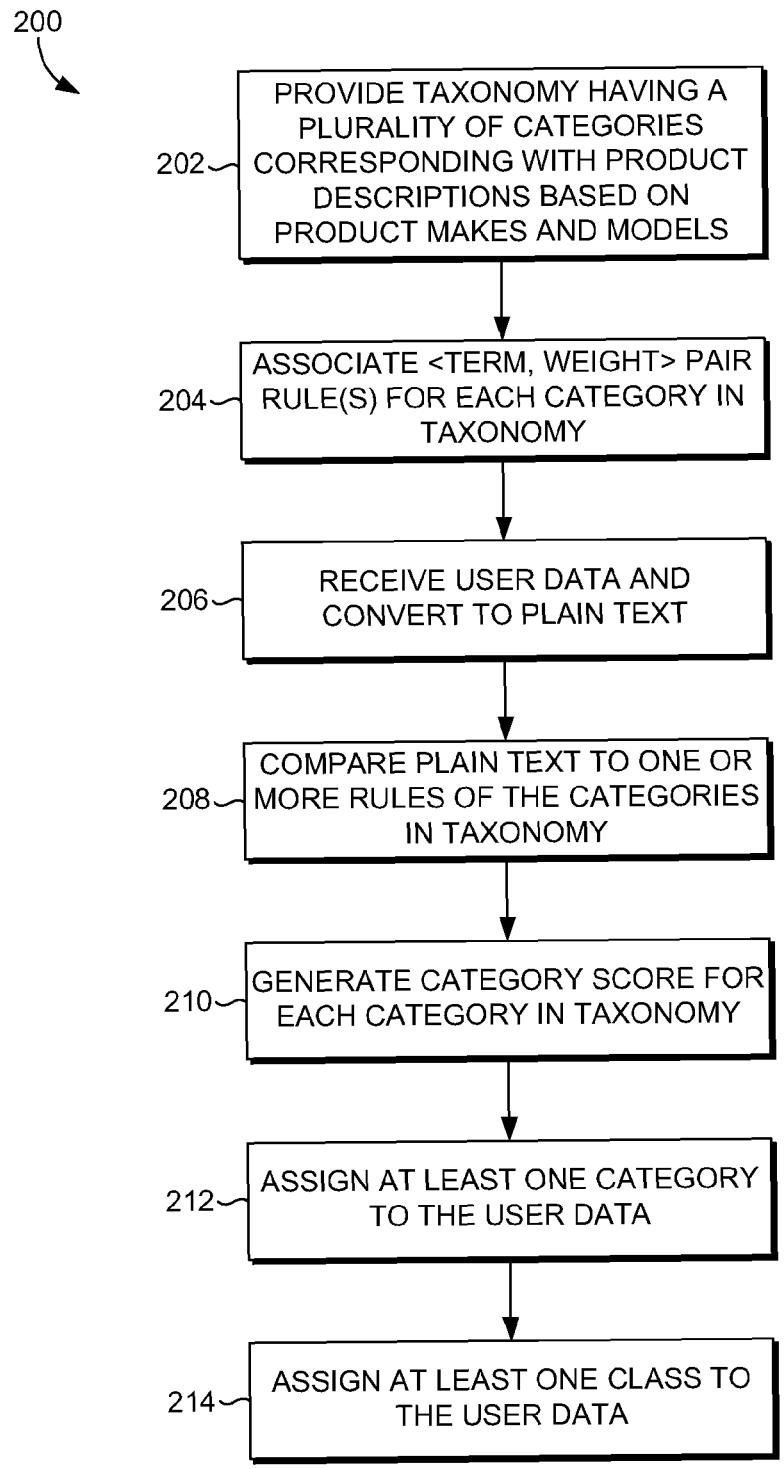
FIG. 2 is a flow diagram showing one embodiment of a method for assigning make and model categories and/or classifications to user data.

As indicated previously, embodiments of the present invention are directed to assigning a product classification to user data based on a taxonomy of makes and models. Referring now to FIG. 2, a flow diagram illustrates a method 200 for assigning product classifications to user data based on a taxonomy of makes and models in accordance with an embodiment of the present invention. Initially, as shown at block 202, a taxonomy is provided, having a plurality of categories corresponding with product descriptions based on product makes and models. In one embodiment, the taxonomy may be arranged in a hierarchy, such that higher level categories are described with less specificity, and lower level categories are described with more specificity. A taxonomy may define different categories based on any number of product descriptions. For instance, a taxonomy for a particular brand of camera may include two categories for two different models of the manufacturer's camera. Within each camera model category, there may be additional sub-categories for different camera models, such as different colors, capabilities, or other differentiating factors. In embodiments, multiple taxonomies are created for multiple related products. For example, seven different taxonomies may be provided for seven different automobile manufacturers. As such, the seven automobile manufacturer taxonomies may include a number of categories and subcategories based on the different models, and the different features of each model. Alternatively, in one embodiment, a single taxonomy is provided for a single type of product, such as an automobile.

As shown at block 204, a <term, weight> pair rule is associated with each category in the taxonomy. Each category in a taxonomy may be associated with more than one rule. As previously discussed, multiple rules for the same category may be based on variations in spelling, formatting, and other term characteristics. Similarly, rules may vary by the weight assigned to a particular rule based on the relevance of the term. For example, for a taxonomy of Nikon brand cameras, a rule may have a higher weight for the term "Nikon" than for the term "Nik," since it is unclear whether the term "Nik" refers to the product category for "Nike" or "Nikon." In one embodiment, multiple rules for a single category are sorted by the number of words in the terms. Such ordering may assist in quicker processing. For instance, a rule for a category may include four words in the <term, weight> pair rule, while another rule may only include three words. As such, in embodiments, rules with more words may be ordered before rules with fewer words.

At block 206, user data is received and converted to plain text. User data may be received from a single user or multiple users, and may include data from webpages viewed, search queries entered, or the like. User data may be received directly from a user, or indirectly from a third party, such a search engine provider. In embodiments, data is converted to plain text to enable a comparison with the terms of rules for categories in a taxonomy.

As shown at block 208, the plain text is compared to the rules of the categories in the taxonomy. Comparing the plain text to rules of the categories includes determining whether any terms of the rules are present in the user data. For example, a rule with the term "BMW 3 Series" is compared to user data to determine whether the user data includes the term "BMW 3 Series." In embodiments, comparing the plain text of the user data to rules includes determining if one or more terms in the plain text match one or more terms in the rules. Based on comparing the rules to the categories in the taxonomy, at block 210, a category score is generated for each category in the taxonomy. A category score is derived from the weights assigned to the rules for categories. For example, a rule for <BMW 3 Series, 4> may assign a category score of "4" to the "BMW 3 Series" category.

As shown at block 212, at least one category is assigned to the user data. The category score generated for each category is used to assign at least one category to the user data. A category may be assigned to user data by selecting a top number of categories based on category scores. For example, the top three categories with the highest category scores may be assigned to user data. In another embodiment, categories are assigned based on whether the corresponding category scores exceed an established threshold. For example, a minimum category score of five may be required before assigning a category to user data. In a further embodiment, categories with category scores significantly higher than the category scores of other categories in a taxonomy may be assigned to user data. For example, if a category score for a single category exceeds the category scores of other categories in a taxonomy by an established amount, then the category may be assigned to the user data. At block 214, at least one class is assigned to the user data. In embodiments, categories in a taxonomy are associated with one or more classes. As such, a class is assigned to the user data based on the categories assigned to the user data. A class may be associated with more than one category in a taxonomy, and with more than one taxonomies for different product manufacturers.

Figure 3:
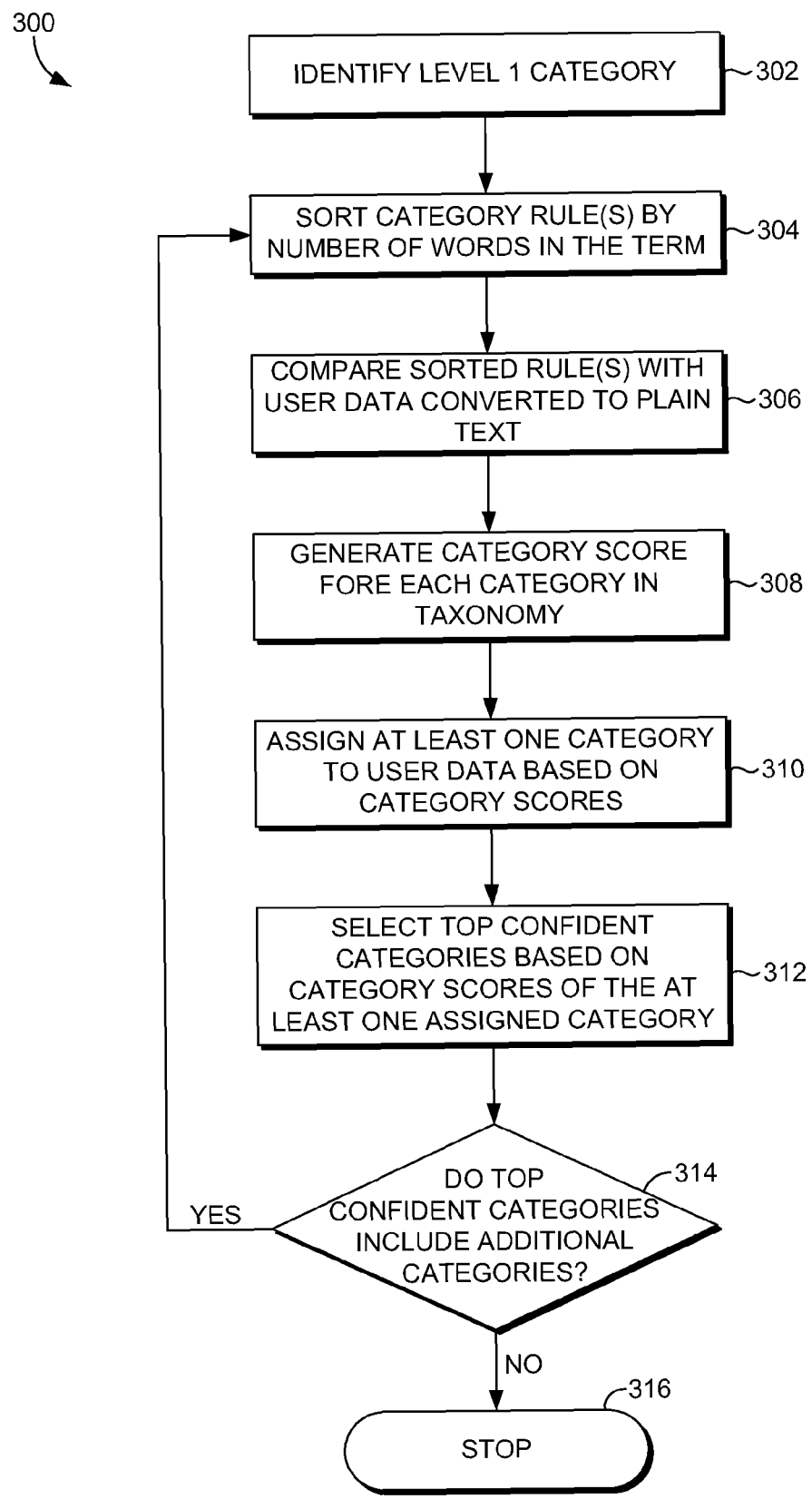
FIG. 3 is a flow diagram showing another embodiment of a method for assigning make and model categories and/or classifications to user data.

Turning now to FIG. 3, a flow diagram illustrates a method 300 for assigning product classifications to user data based on a taxonomy of makes and models in accordance with an embodiment of the present invention. Initially, as shown at block 302, a level one category is identified. A level one category refers to the first level of categories in a taxonomy, with the least level of specificity. In embodiments, a taxonomy includes a single level one category. For example, for the BMW taxonomy, the first level in the taxonomy may be the "BMW" category. In other embodiments, a taxonomy includes multiple level one categories. As shown at block 304, category rules are sorted by the number of words in the terms of the rules. As previously discussed, a number of rules may be associated with a particular category in a taxonomy. For example, there may be multiple rules associated with the level 1 "BMW" category in the BMW taxonomy. At block 306, the sorted rules are compared in sorted order to user data that was converted to plain text. By comparing the rules in sorted order, not all rules are necessarily compared to user data. For example, having associated a rule with a higher level of specificity to user data, there is no need to associate user data with rules for the same category having less specificity. The user data may include webpages viewed, search queries entered by a user, and the like. In embodiments, the plain text of the user data is compared to the terms in the <term,weight> pair rules associated with each category. For example, the rules for the level one category "BMW" are compared to plain text user data to determine whether any items of user data include the term "BMW." In embodiments, comparing plain text to rules includes making a determination as to whether the plain text user data matches the terms of the rules.

As shown at block 308, a category score is generated for each category in the taxonomy. As such, user data that includes the term "BMW" may produce a category score of "5" for the BMW category. Category scores may be generated for a single taxonomy level at a time. For example, a category score may be generated for the level one "BMW" category before generating category scores for any additional categories in the same taxonomy. Alternatively, category scores may be generated for each category at each level of a taxonomy at the same time. At block 310, at least one category is assigned to the user data based on category scores. For example, the BMW category may be assigned to the user data based on a category score of "5." In embodiments, category scores generated for a single taxonomy level are used to assign categories from a single level at a time. In other embodiments, category scores generated for each category in each level of a taxonomy are used to assign categories to user data.

At block 312, top confident categories are selected based on the category scores of the assigned categories. For example, the "BMW" category, with a category score of "5," may satisfy a threshold that designates this category as a top confident category. As shown at block 314, a determination is made as to whether the top confident categories include any child categories. If there are no child categories, as shown at block 316, the method of assigning product categories is stopped. If there are child categories, the method repeats to step 304, where the rules for the child categories are sorted, and the method continues to assign additional categories to the user data.

Figure 4:
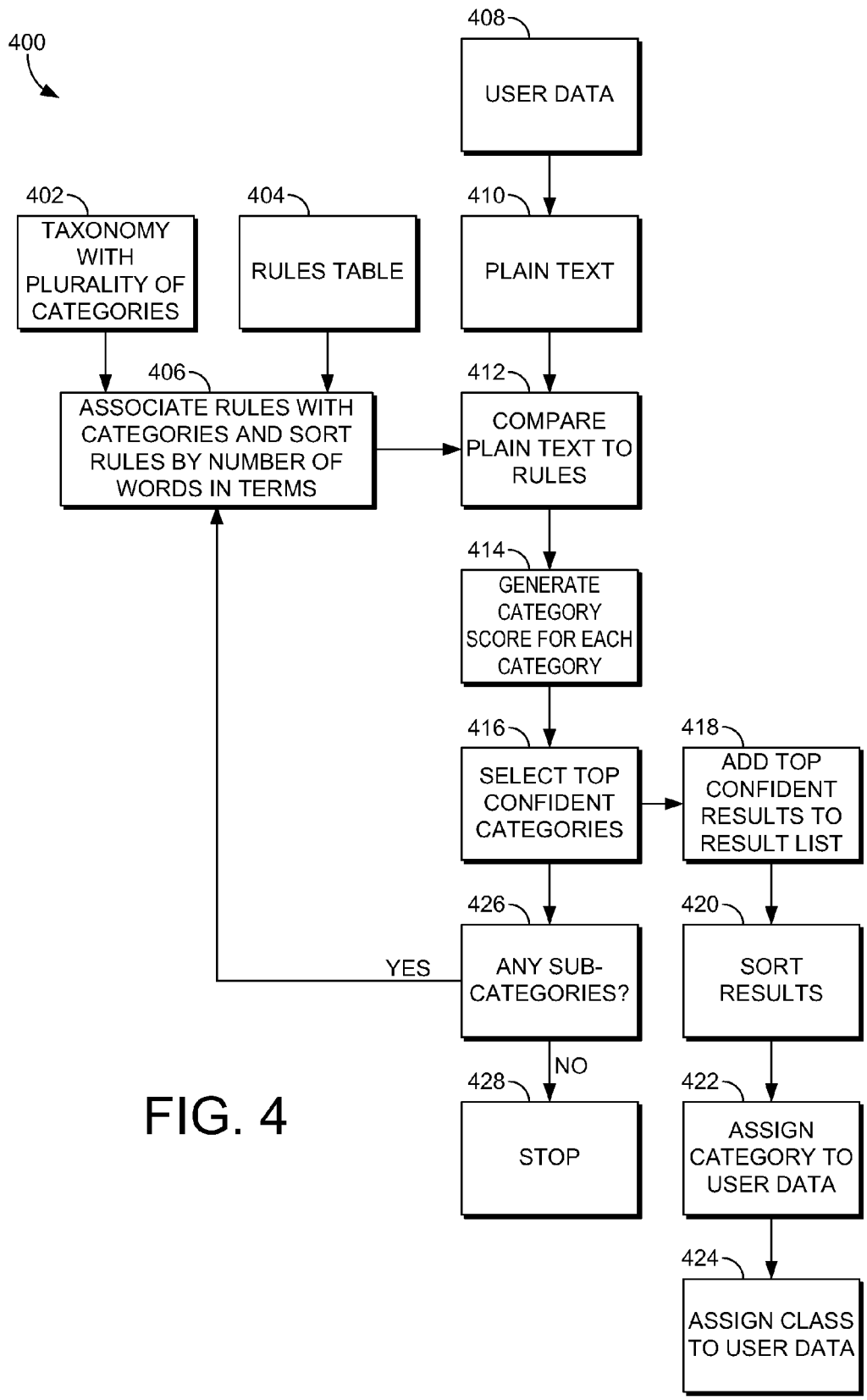
FIG. 4 is a flow diagram showing a further embodiment of a method for assigning make and model categories and/or classifications to user data.

Referring next to FIG. 4, a flow diagram illustrates a method 400 for assigning product categories and classifications to user data based on a taxonomy of makes and models in accordance with an embodiment of the present invention. At step 402, a taxonomy having a plurality of categories based on product descriptions of product makes and models is provided. In embodiments, the taxonomy includes categories based on product descriptions of makes and models, as well as corresponding classes. At step 404, a rules table having rules associated with each category in a taxonomy is provided. As shown at step 406, the rules are associated with categories and sorted by the number of words in the rules. At step 408, user data is received, and converted to plain text at step 410. As shown at step 412, the plain text is compared to the rules for the categories in the taxonomy. At step 414, a category score is generated for each category in the taxonomy.

At step 416, the category scores generated at step 414 are used to select top confident categories. The top confident categories are added to a scored result list at step 418. The result list is sorted at step 420 and a category is assigned to the user data at step 422. As shown at step 424, a class is then assigned to the user data, based on a mapping of product classes associated with the assigned category.

Based on the selected top confident categories from step 416, a determination is made at step 426 whether the top confident categories include any child categories at a next level in the hierarchy of the taxonomy. At step 428, if there are no child categories, or sub-categories, then the method of assigning categories stops. If there are child categories, the method returns to step 406, where rules are associated with the child categories and sorted by the number of terms. The method continues until it is determined that there are no sub-categories for any of the top confident categories assigned to the user data.

Figure 5:
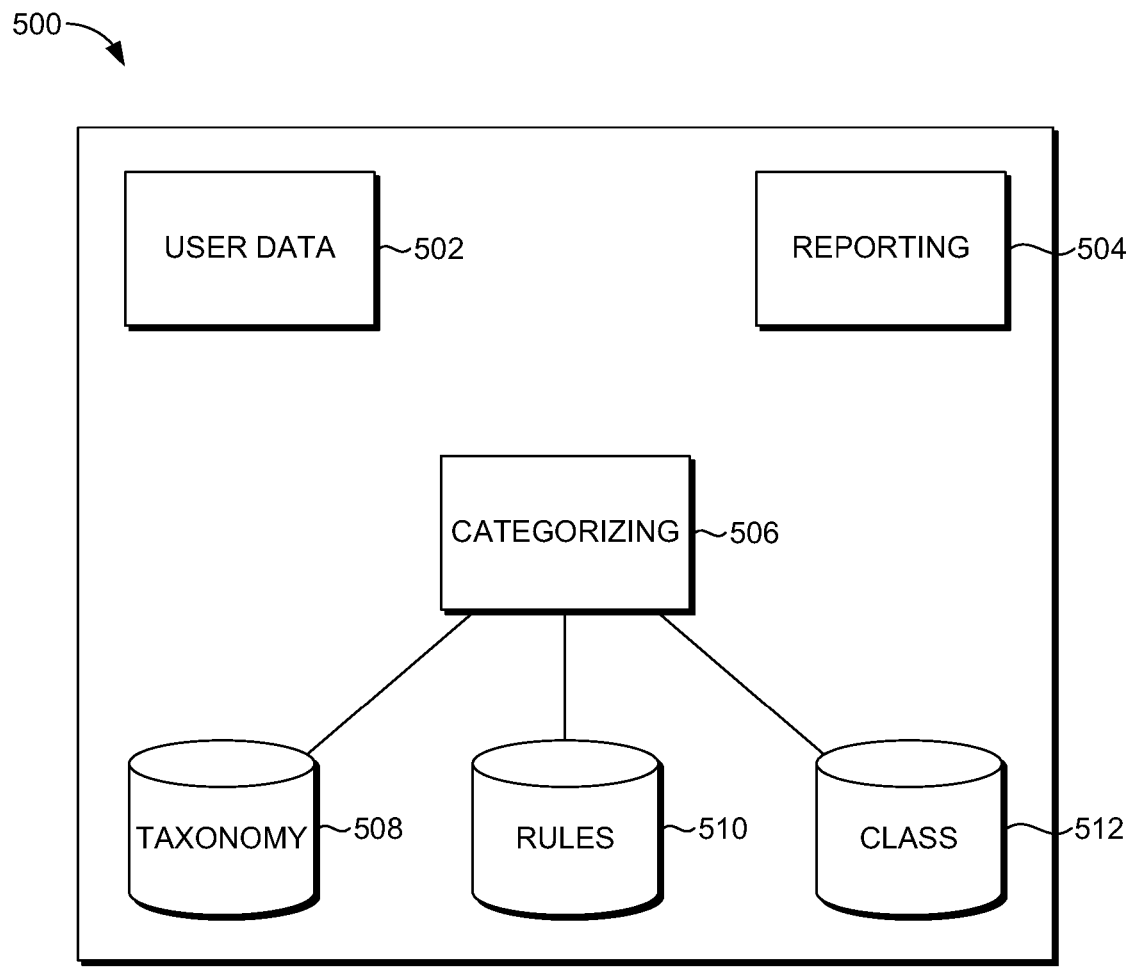
FIG. 5 is an exemplary system in which embodiments may be employed for assigning make and model categories and/or classifications to user data.

Finally, referring now to FIG. 5, an exemplary computing system 500 generally includes, among other components not shown, a user data component 502, a reporting component 504, a categorizing component 506, a taxonomy database 508, a rules database 510, and a class database 512. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, taxonomy database 508 and class database 512 may be combined into a single database of taxonomies related to product categories and classes. Various functions described herein as being performed by one or more entities may be carried out by hardware, firmware, and/or software. For instance, various functions may be carried out by a processor executing instructions stored in memory.

The user data component 502, reporting component 504, and categorizing component 506 may each include any type of computing device, such as computing device 100 described with reference to FIG. 1, for example. Alternatively, the components may be separate applications executed by one or two computing devices. The components of the system 500 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of user data components, reporting components, and categorizing components may be employed within the system 500 within the scope of the present invention. Each may comprise a single device or multiple devices cooperating in a distributed environment. For instance, the categorizing component 506 may comprise multiple devices arranged in a distributed environment that collectively provide the functionality of the categorizing component described herein. Additionally, other components not shown may also be included within the system 500.

Generally, the system 500 illustrates an environment in which product categories and/or classifications are assigned to user data based on a taxonomy of makes and models. Taxonomy database 508 provides one or more taxonomies having categories corresponding to product descriptions based on makes and models. Rules database 510 provides rules for the categories in the taxonomy database. As can be understood, taxonomy database 508 and rules database 510 may be combined in a single database of taxonomies with categories and associated rules. Class database 512 provides product classes that are associated with categories of product makes and models. Class database 512 may include a number of classes that corresponds to taxonomies of product categories. Alternatively, class database 512 and taxonomy database 508 may be combined into a single database of taxonomies relating to product make, model, and class.

Categorizing component 506 accesses taxonomy database 508, rules database 510, and class database 512 to assign a category of product make and model to user data. As such, user data component 502 provides user data to categorizing component 506. User data component 502 receives user data from search queries entered by a user, webpages viewed by a user, and the like. User data is converted to plain text by user data component 502 so that it may be categorized by categorizing component 506. Reporting component 504 reports the assigned product category and product class to a requesting party. In embodiments, the requesting party may be a third party inquiring about user preferences with respect to particular products. For example, the reporting component 504 may provide an advertiser with a particular car model and class that a particular user or group of users prefers, based on the search queries and webpage views of the user or group of users.

In embodiments, a request is made to system 500 to determine a particular user's preferences for a product make or model or to determine the preferences for a group of users. User data component 502 is queried for items of user data relevant to a particular user or group of users. The data is categorized by categorizing component 506 based on product make and model taxonomies and the corresponding rules. Reporting component 504 then provides a report assigning a product category and product classification to the user data.

As can be understood, embodiments of the present invention assign product categories and/or classifications to user data based on a taxonomy of makes and models. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, causes the one or more computing devices to perform a method comprising:
   providing a taxonomy having a plurality of categories, each category corresponding with a product description based on product makes and models;
   associating one or more rules with each category in the taxonomy;
   receiving user data;
   converting the user data into plain text;
   generating a category score for each of one or more categories in the taxonomy by comparing the plain text to one or more rules of each of the one or more categories; and
   assigning at least one category from the one or more categories to the user data based on the category score for each of the one or more categories;
   wherein generating a category score for each of the one or more categories comprises:
   determining a category score for each category in a current level in the taxonomy;
   selecting one or more top confident categories from the current level by comparing the category scores generated for each category in the current level in the taxonomy with one or more thresholds;
   determining that at least one top confident category includes at least one child category at a next level in the taxonomy;
   generating a category score for each child category associated with the at least one top confident category by comparing the plain text to one or more rules for each child category;
   selecting one or more top confident categories from the at least one child category; and
   repeating determining a category score for each category in a current level in the taxonomy, selecting one or more top confident categories from the current level, determining that at least one top confident category includes at least one child category at a next level in the taxonomy, generating a category score for each child category associated with the at least one top confident category, and selecting one or more top confident categories from the at least one child category, until it is determined that no top confident categories include at least one child category.

2. The one or more computer storage media of claim 1, wherein each rule associated with each category in the taxonomy comprises a pair of a term associated with a weight.

3. The one or more computer storage media of claim 2, wherein associating one or more rules with each category in the taxonomy includes sorting the one or more rules by a number of terms in the one or more rules.

4. The one or more computer storage media of claim 3, wherein comparing the plain text to one or more rules of the one or more categories includes determining if one or more terms in the plain text match one or more terms in the rules.

5. The one or more computer storage media of claim 1, wherein the user data is received from one or more selected from the following:
   a search query; and
   a webpage view.

6. The one or more computer storage media of claim 1, wherein the method further comprises:
   based on assigning the at least one category to the user data, assigning one or more classes to the user data.

7. The one or more computer storage media of claim 1, wherein the method further comprises:
   generating a result list that includes the category scores for each of the one or more categories.

8. The one or more computer storage media of claim 7, wherein the result list is sorted in descending order.

9. A computer system executed by one or more computer processors, comprising:
   one or more computing devices, wherein each of the one or more computing devices has a processor and a memory, and further wherein the one or more computing devices comprises a user data component, an assigning component, and a reporting component,
   wherein the user data component is configured to receive user data and convert the user data into plain text,
   the assigning component is configured to assign at least one category from a plurality of categories in a taxonomy to the user data based on the plain text, each category corresponding with a product description based on product makes and models,
   and the reporting component is configured to report the at least one category assigned to the user data,
   wherein the assigning component assigns at least one category from the plurality of categories in a taxonomy by:
   associating one or more rules with each category in the taxonomy;
   generating a category score for each of one or more categories in the taxonomy by comparing the plain text to one or more rules of the one or more categories; and
   assigning at least one category from the one or more categories to the user data based on the category score for each of the one or more categories,
   and further wherein generating a category score for each of one or more categories comprises:
   determining a category score for each category in a current level in the taxonomy;
   selecting one or more top confident categories from the current level by comparing the category scores generated for each category in the current level in the taxonomy with one or more thresholds;
   determining that at least one top confident category includes at least one child category at a next level in the taxonomy;
   generating a category score for each child category associated with the at least one top confident category by comparing the plain text to one or more rules for each child category;
   selecting one or more top confident categories from the at least one child category; and
   repeating determining a category score for each category in a current level in the taxonomy, selecting one or more top confident categories from the current level, determining that at least one top confident category includes at least one child category at a next level in the taxonomy, generating a category score for each child category associated with the at least one top confident category, and selecting one or more top confident categories from the at least one child category until it is determined that no top confident categories include at least one child category.

10. The system of claim 9, wherein the one or more rules of the one or more categories in the taxonomy comprise one or more pairs of a term associated with a weight.

11. The system of claim 10, wherein the one or more rules of one or more categories are sorted by a number of words in the terms.

12. The system of claim 9, wherein the reporting component generates a result list that includes category scores for each of one or more categories.

13. The system of claim 9, wherein the user data is received from one or more selected from the following:
a search query and a web page view.

14. The system of claim 9, wherein the assigning component assigns at least one class to the user data.

15. The system of claim 14, wherein the reporting component reports the at least one class assigned to the at least one category assigned to the user data.

16. One or more computer storage media storing computer-useable instructions that, when used by one or more computing devices, cause the one or more computing devices to perform a method comprising:
providing a taxonomy having a plurality of categories, each category corresponding with a product description based on product makes and models;
associating one or more rules with each category in the taxonomy, each rule comprising one or more pairs of a term associated with a weight;
receiving user data, wherein the user data is received from one or more selected from the following:
a search query; and
a web page view;
converting the user data to plain text;
sorting the one or more rules for each category in the taxonomy by a number of words in one or more terms;
generating a category score for each category in a current level in a taxonomy by comparing the plain text to one or more rules of each of the one or more categories;
assigning at least one category from the one or more categories to the user data based on the category score for each category in the current level;
selecting one or more top confident categories for the current level by comparing the category scores for each category in the current level in the taxonomy with one or more thresholds;
determining that at least one top confident category includes at least one child category at a next level in the taxonomy;
generating a category score for each child category associated with the at least one top confident category by comparing the plain text to one or more rules for each child category;
assigning at least one child category from the current level to the user data based on the category score for the at least one child category;
selecting one or more top confident categories from the at least one child category;
assigning at least one class to the user data based on the at least one assigned category and the at least one assigned child category; and
repeating generating a category score for each category in a current level in the taxonomy, assigning at least one category from the one or more categories to the user data, selecting one or more top confident categories from the current level, determining that at least one top confident category includes at least one child category at a next level in the taxonomy, generating a category score for each child category associated with the at least one top confident category, selecting one or more top confident categories from the at least one child category, and assigning at least one class to the user data based on the at least one assigned category and the at least one assigned child category until it is determined that no top confident categories include at least one child category.

17. The one or more computer storage media of claim 16, wherein comparing the plain text to one or more rules of the one or more categories includes determining if one or more terms in the plain text match one or more terms in the rules.

* * * * *